June 17, 1952 — H. B. FERGUSSON — 2,600,630
CONSTRUCTION OF THICK-WALLED HIGH-PRESSURE VESSELS
Filed Jan. 17, 1947
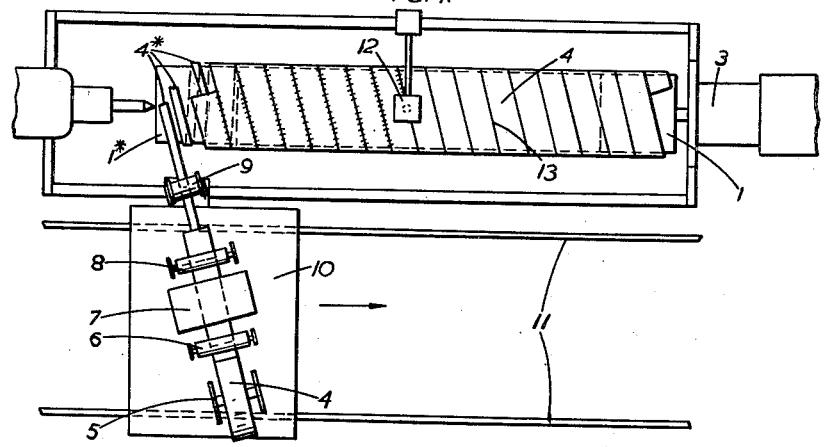//
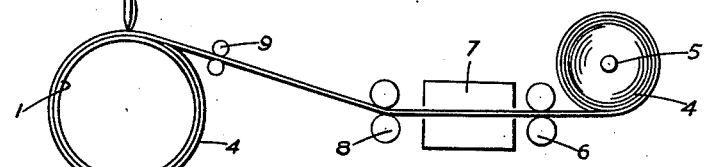
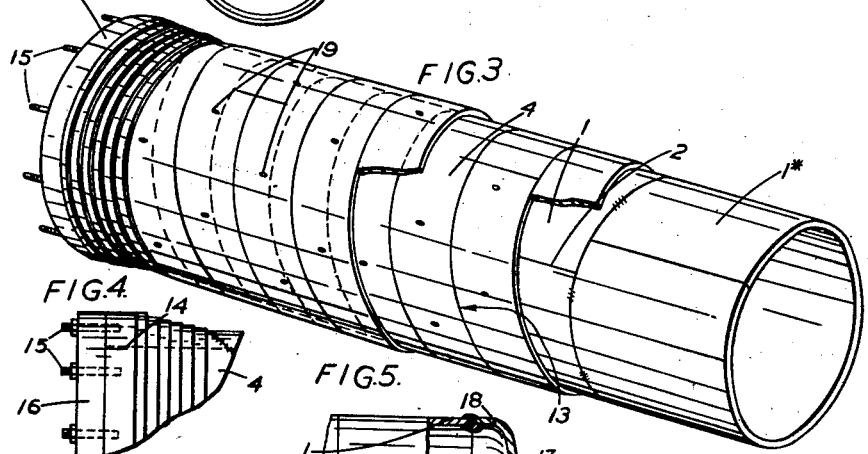
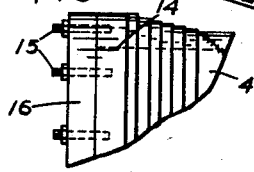
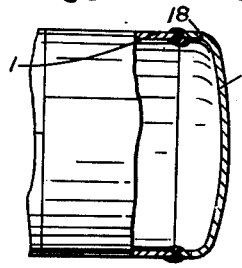
Inventor
Hugh Boscawen Fergusson
By A. Knight Croad
Attorney Patented June 17, 1952

2,600,630

UNITED STATES PATENT OFFICE 2,600,630

CONSTRUCTION OF THICK-WALLED HIGH-PRESSURE VESSELS

Hugh Boscawen Fergusson, Bromley, England

Application January 17, 1947, Serial No. 722,592
In Great Britain January 22, 1946

2 Claims. (Cl. 29—148.2)

This invention relates to the construction of thick walled high pressure vessels and it has for its object to reduce the cost of producing very thick walled pressure vessels and to obtain a more even distribution of the circumferential stresses in the wall of the vessel than is possible in the case of solid wall pressure vessels. A further object of the invention is to produce vessels with walls of any desired thickness.

According to this invention it is proposed to form thick walled pressure vessels by first forming an open-ended cylinder from a steel plate, welding the longitudinal seam and thereafter removing the proud welding, winding a strip of steel spirally round the outer surface of the cylinder, welding the adjacent edges of the strip, winding and welding one or more further layers of strip steel on to the built up cylinder, the second and subsequent layers being staggered relatively to the previous layer or spirally wound in the reverse direction to the previous layer: the ends of the cylinder thus formed may be built up by additional windings to form flanges or thickened ends which may be drilled and tapped to receive studs by means of which closure ends may be secured to the cylinder.

In the accompanying drawings which illustrate this invention:

Figure 1 is a plan view diagrammatically illustrating a lay out of one means of carrying out the invention.

Figure 2 is an end view thereof.

Figure 3 is a perspective view illustrating a partially formed vessel constructed according to this invention.

Figure 4 is a fragmentary view of a part of the vessel shown in Figure 3, and

Figure 5 is a fragmentary view of a modification.

According to the embodiment of this invention illustrated in the drawings, an open ended cylinder 1 is first formed from a steel plate by rolling, the longitudinal seam 2 being welded, and to produce a smooth outer surface the outside proud welding is removed, the cylinder thus formed is supported, as shown in Figure 1, is rotatably supported in a suitable machine, such as in a screw-cutting lathe 3. A strip of steel 4, which may be mild steel or alloyed steel, of any desired width from a few inches up to two feet or more and having a thickness of from one-eighth to one-quarter of an inch is fed from a drum 5 through flattening rollers 6, then through a heating furnace 7 from which the heated strip is passed through tension rollers 8 by means of which any desired stress can be placed on the strip, which strip then passes through guide rollers 9 attached to the tool box on the lathe from which it is spirally wound round the outer surface of the cylinder 1 which may be cooled in any conveninent manner such as by causing water to flow through the inside of the cylinder 1.

The drum 5 on which the strip 4 is mounted, the flattening rollers 6, furnace 7, tension rollers 8 and means for measuring the tension on the strip, may all be mounted on a frame mounted on a truck 10 running on rails 11, said truck being connected to the tool box of the lathe so that it travels therewith, the frame or truck is capable of being swivelled horizontally and set at any desired angle relatively to the axis of the cylinder 1.

An automatic welding head 12 is attached to the toolbox on the opposite side of the lathe, or if desired on the same side as the furnace and other parts, for the purpose of welding the spiral joint 13 of the strip 4 while it is being wound on, or, the strip 4 may be wound the full length of the cylinder 1 and the welding of the spiral joint effected afterwards.

With the object of ensuring that the main strip 4 is in a hot condition when it reaches the cylinder 1, a narrow band or strip 4* may be welded to the end of the main strip 4 coming off the drum 5, and the free end of this narrowed strip 4* is welded to a short extension 1*, of the same diameter as the cylinder 1, which extension has been previously tack-welded to one end of the main cylinder 1.

One or more further layers of the strip 4 may be wound round the outer surface of the first spiral winding, the second or subsequent layer or layers being staggered relatively to the previous under layer so as to permit the welded joint to be staggered, or, alternatively the second or subsequent layers may be spirally wound in the reverse direction. The winding of layers on the cylinder is continued until a wall thickness sufficient to withstand the desired working pressure is attained.

The ends of the cylinder thus formed may be built up still further by additional windings, spirally or in any other convenient manner, as shown in Figure 4, to form a flange as at 14 in which holes may be drilled and tapped to receive screw threaded studs 15 by means of which the ends of the pressure cylinder are closed with forged ends 16, or alternatively the ends may be closed by means of a solid dished and flanged domed, pressed or spun end 17. By this method it would not be necessary to build up the ends of the cylinder as the flange 18 of the end 17 would be the same thickness as the main wall of the built up cylinder and would be directly welded thereto as shown in Figure 5.

In order to prevent excessive pressures being placed on the outer layers of the strip in the event of corrosion or leakage from the inner cylinder, holes 19 may be drilled or punched through each layer or strip either before or after it is wound on the cylinder 1.

With reference to the statement that provision is made for cooling the cylinder 1 as the heated strip 4 is wound thereon it may be stated that it has been found that when the first layer or strip is wound on, the inner cylinder gets hot and expands. The strip 4, being thinner, cools first, while the thicker cylinder is still hot, and as the cylinder shrinks in cooling it forms a loose fit with the strip.

The main object of the invention is to produce very thick welded vessels for very high pressures and avoid the necessity of bending thick plates into a cylindrical form to make the shells of these pressure vessels and also to pre-stress by compression the inner portion of the wall of said vessel so as to have the advantage of a considerable amount of pressure being required to take up the pre-compressive stress before any tensile stress comes on the wall of the vessel.

What I claim is:

1. The method of producing thick-walled pressure vessels, which consists in first forming an open ended cylinder from a steel plate; welding the seam and thereafter removing the proud welding; tack welding a short extension to one end of the cylinder; winding a heated strip of steel having a narrow metal band welded to one end spirally around the outer surface of the welded cylinder, the extreme end of said narrow metal band being welded to the outer surface of said short extension in order to ensure that said strip of steel is at the desired temperature when it reaches the cylinder; welding the adjacent edges of the strip; winding and welding a further layer of strip steel on to the outer surface of the first strip, the adjacent edges of said second strip being staggered with respect to the adjacent edges of the first strip; and further providing the cylindrical vessel thus formed with thickened ends which may be drilled and tapped to receive studs by means of which closure ends may be secured to the cylinder by welding a narrow steel band to the end of the main steel strip.

2. The production of thick-walled pressure vessels which consists in first forming an open-ended cylinder from a flat steel plate, welding the seam and thereafter removing the proud welding, welding the end of a flat strip of steel to the cylinder and subsequently winding same spirally round the outer surface of said cylinder, welding the adjacent edges of the strip, welding the end of a second strip of steel to the first layer adjacent one end thereof and winding said second strip onto the outer surface of the first strip, the adjacent edges of said second strip being staggered relatively to the adjacent edges of the first strip, the cylindrical vessel thus formed being provided with thickened ends by spirally winding outwardly toward the end of said cylindrical vessel a steel strip thereon in a stepped formation to form roughly a conical end having the larger diameter thereof at the outer end of said cylindrical vessel and the smaller end thereof extending inwardly upon the latter cylindrical vessel.

HUGH BOSCAWEN FERGUSSON.

REFERENCES CITED

The following references are of record in the file of this patent:

UNITED STATES PATENTS

| Number | Name | Date |
|---|---|---|
| 285,576 | Coas | Sept. 25, 1883 |
| 741,413 | Reed | Oct. 3, 1903 |
| 1,918,137 | Sarritt | July 11, 1933 |
| 1,942,304 | Mylting | Jan. 2, 1934 |
| 2,067,801 | Taylor | Jan. 12, 1937 |
| 2,216,606 | Taylor | Oct. 1, 1940 |
| 2,253,093 | Raichle et al. | Aug. 19, 1941 |
| 2,268,961 | Raymond et al. | Jan. 6, 1942 |
| 2,295,420 | Moore | Sept. 8, 1942 |
| 2,326,176 | Schierenbeck | Aug. 10, 1943 |
| 2,348,765 | Trickey | May 16, 1944 |
| 2,490,795 | Gay | Dec. 13, 1949 |